United States Patent [19]
Helbling

[11] 3,953,787
[45] Apr. 27, 1976

[54] DRIVE SYSTEM

[76] Inventor: Edward Helbling, 393 E. 5th St., Brooklyn, N.Y. 11230

[22] Filed: Oct. 24, 1974

[21] Appl. No.: 517,840

Related U.S. Application Data

[63] Continuation-in-part of Ser. No. 448,929, March 7, 1974, abandoned.

[52] U.S. Cl. ............................ 322/13; 290/DIG. 9; 60/327; 60/486
[51] Int. Cl.² .......................................... H02P 9/00
[58] Field of Search ............ 60/325, 327, 403, 404, 60/486; 290/DIG. 9; 322/13

[56] References Cited
UNITED STATES PATENTS

| | | | |
|---|---|---|---|
| 2,074,618 | 3/1937 | Roeder | 60/486 X |
| 2,483,349 | 9/1949 | Petty et al. | 60/486 X |
| 2,512,119 | 6/1950 | Stone et al. | 60/403 X |
| 3,315,085 | 4/1967 | Mileti et al. | 290/4 R |
| 3,558,901 | 1/1971 | Jacobus | 322/4 X |
| 3,675,112 | 7/1972 | Smith | 322/4 |
| 3,683,255 | 8/1972 | Schroeder | 320/2 |

FOREIGN PATENTS OR APPLICATIONS

| | | | |
|---|---|---|---|
| 506,134 | 5/1920 | France | 60/325 |
| 569,366 | 7/1957 | Italy | 60/486 |

*Primary Examiner*—Edgar W. Geoghegan
*Attorney, Agent, or Firm*—Michael J. Striker

[57] ABSTRACT

A motor is to be driven from a source of high-voltage electric energy, and a generator is adapted to produce a lower-voltage electric energy. A hydraulic stepdown arrangement is provided which drives the generator from the motor and which includes at least one closed hydraulic circuit having a conduit loop, a plurality of hydraulic pumps of successively greater capacity which are driven by the motor, and a fluid-driven rotor coupled with the generator for driving the same. The rotor receives the combined fluid output of the hydraulic pumps. Other drive systems are also disclosed.

4 Claims, 3 Drawing Figures

DRIVE SYSTEM

CROSS-REFERENCE TO RELATED APPLICATIONS

This is a continuation-in-part of my copending application Ser. No.: 448,929, filed Mar. 7, 1974 and now abandoned.

BACKGROUND OF THE INVENTION

The present invention relates generally to a drive system, for example a transformer arrangement such as a step-down transformer arrangement for stepping down voltage from a higher to a lower voltage level.

The theory and practice of electrically stepping down or transforming down a higher voltage to a lower voltage are already well known. However, in certain instances it may be desirable not to resort to this conventional practice, and heretofore no alternative possibility has become known.

SUMMARY OF THE INVENTION

It is a general object of the invention to provide a very versatile drive system.

It is also an object of the invention to provide a novel step-down transformer arrangement.

Another object of the invention is to provide a step-down transformer arrangement wherein the stepping-down of the voltage is accomplished hydraulically.

In keeping with these objects, and others which will become apparent hereafter, one feature of the invention resides, in a step-down transformer arrangement, in a motor which is adapted to be driven from a source of high-voltage electric energy, and a generator which is adapted to produce lower-voltage electric energy. Means are provided for driving the generator from the motor, comprising at least one closed hydraulic circuit including a conduit loop, a plurality of hydraulic pumps of successively greater capacity which are driven by the motor, and a fluid-driven rotor coupled with the generator for driving the same and which receives the combined fluid output of the hydraulic pumps.

The novel features which are considered as characteristic of the invention are set forth in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
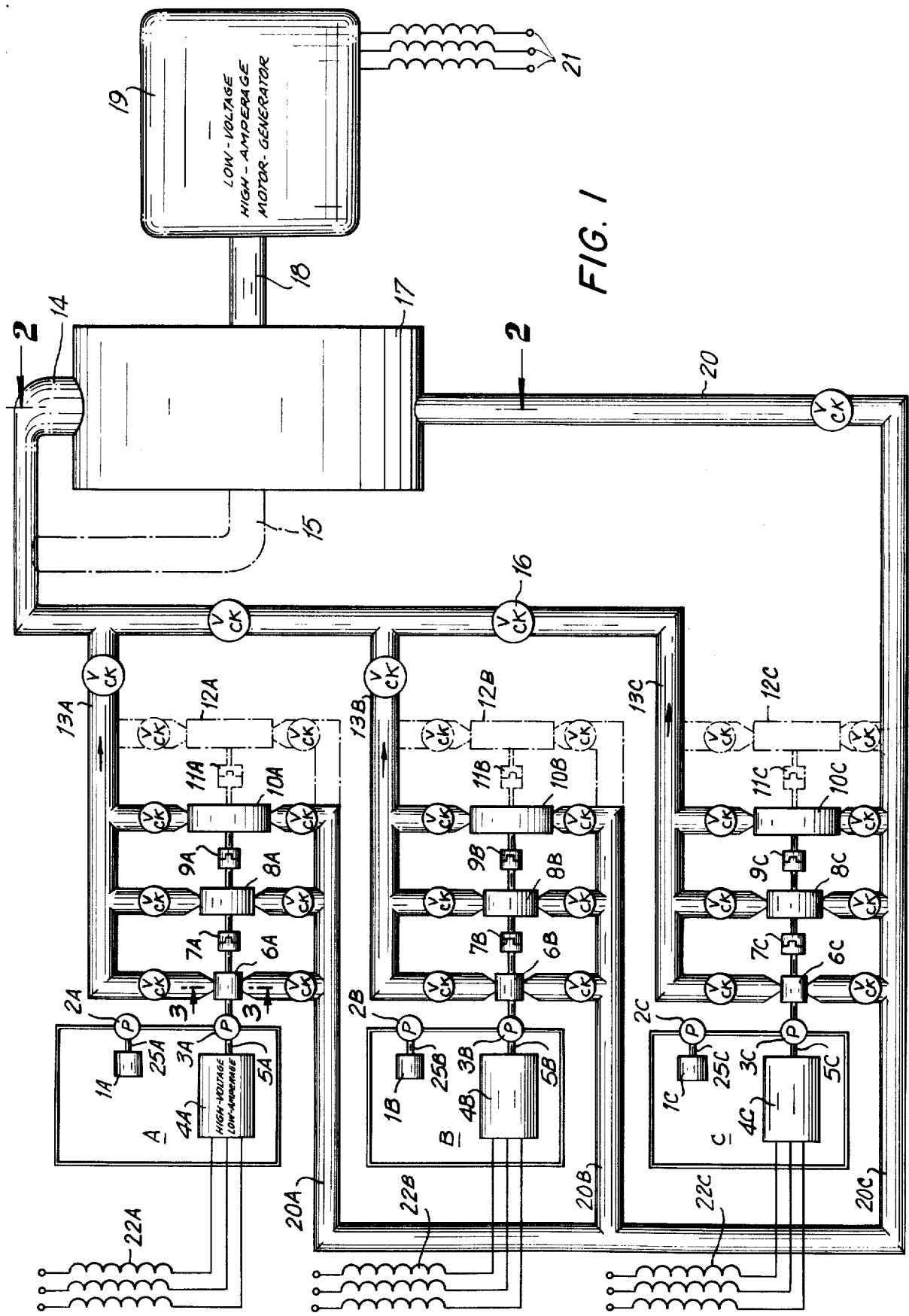
FIG. 1 is a somewhat diagrammatic arrangement illustrating an embodiment of the invention.
Figure 2:
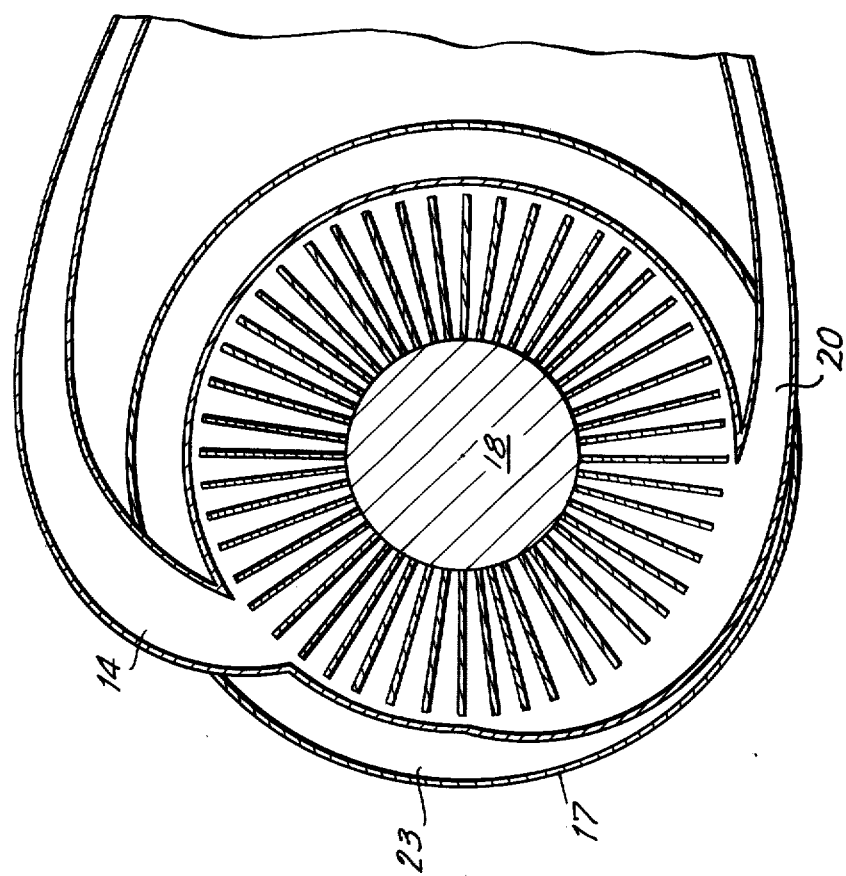
FIG. 2 is a section taken on line 2—2 of FIG. 1.
Figure 3:
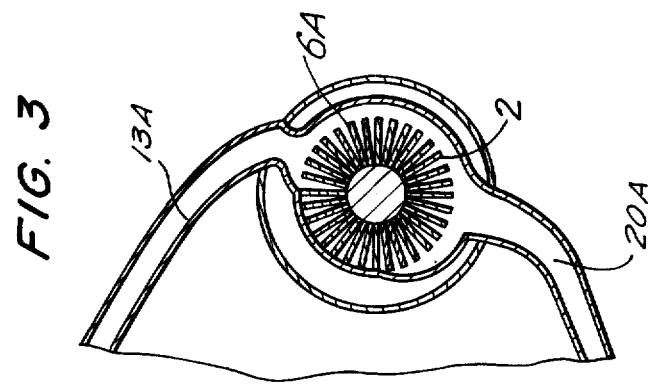
FIG. 3 is a section on line 3—3 of FIG. 1.

FIGS. 1 – 3 illustrate by way of example an embodiment of my invention in a step-down transformer arrangement.

FIG. 1 shows particularly clearly that in the embodiment I have chosen to illlustrate there are three complete step-down circuits provided which can operate individually or in combination to drive a generator 19.

I will first describe one of these circuits, identified generally by reference character A, and will then subsequently describe the circuits B and C.

The circuit A receives electric energy from a diagrammatically illustrated source 22A, for instance electric energy at 17,000 volts. This energy is to be stepped down to, for example, 220 volts, or perhaps 380 or 110 V which corresponds to the output that the generator 19 is capable of producing. The power supplied by the source 22A is applied to an appropriately dimensioned motor 4A, that is in the present instance a motor which can operate at 17,000 volts. The motor has a drive shaft 5A which is coupled with a pump 3A that is interposed in an auxiliary conduit loop in which there is also interposed a further pump 2A and a smaller electric motor 1A having a drive shaft 25A that is coupled with the pump 2A. To start up the arrangement, and to avoid power surges that might result from starting of the motor 4A directly from the source 22A, the smaller motor 1A is energized to drive the pump 2A. The pump 2A circulates liquid in the auxiliary conduit loop and thereby drives the pump 3A which then acts as a fluid motor and turns over the shaft 5A of the motor 4A, so that the rotor of the motor 4A will already be turning by the time the motor is started by applying electric energy to it. Once the motor 4A turns over upon being so energized, the pump 3A can be disconnected from drive shaft 5A and the pump 2A and the motor 1A can be deactivated. The motor 4A now drives via its shaft 5A a pump 6A which is interposed in a conduit 13A that leads via a further conduit 14 to a large-dimensioned rotor 17, the internal construction of which is illustrated in somewhat diagrammatic section in FIG. 2. When the pump 6A has been brought up to speed, during which time of course it already pumps hydraulic liquid through the conduit 13A in the direction indicated by the arrow, such movement being imposed by the presence of the illustrated check valves, the diagrammatically illustrated clutch 7A is engaged so that the shaft 5A now in turn also drives the pump 8A which is larger-dimensioned and has greater pumping capacity than the pump 6A. The pumping capacity of the pump 8A is now added to that of the pump 6A, and again the liquid must flow through the conduit 13A in the direction indicated by the arrow. When the pump 8A is up to speed, the clutch 9A is engaged and the pump 10A now begins to operate to add its liquid output to that of the pumps 6A and 8A as it flows in the direction of the arrow through the conduit 13A. I have shown by way of example that an additional clutch 11A may be provided by means of which a further pump 12A can be driven, and it should be understood that although for space reasons the pump 12A has been shown to be the same size as the pump 10A, it may actually be larger and have a greater pumping capacity. The engagement and disengagement of the clutches 7A, 9A and 11A is well known in the art and requires no detailed discussion.

The combined liquid output of the pumps 6A, 8A and 10A (and, if the pump 12A is present, of the latter also) now flows via the conduit 14 into the rotor 17 which it turns at high speed. The rotor 17 has an output shaft 18 which is turned and which in turn is coupled with the generator 19. Thus, the generator is turned and produces at its output terminals 21 an electric energy of a reduced voltage, for instance 220 volts. In this manner, the electric energy of the source 22A may be stepped down to the voltage obtained at the terminals 21 without resorting to an electric arrangement for stepping down.

As a safeguard against possible breakdown, to provide an alternative in case of repairs, or for other reasons, a further stage B is provided wherein a motor 48 is supplied with electric energy from a source 22B, for example again, with 17,000 volts of electric energy. The remainder of the arrangement of the stage B corresponds to that of the stage A, except that all reference numerals have the suffix B added to them. The liquid output of the pumps 6B, 8B, 10B and 12B is supplied via the conduit 13B to the conduit 14. The check valve 16 prevents the flow of liquid to the stage C, still to be described, just as the similar check valve between the stage A and the stage B prevents the flow of liquid from the former to the latter.

The stage C has a motor 4C which is supplied with electric energy from the source 22C, again as before. Like reference numerals again identify like components, but have the suffix C added to them.

After passing through the rotor 17 and turning the same by acting upon its illustrated turbine vanes, the liquid flows via the conduit 20 and the check valve provided therein back to the conduit portion 20C wherein it can enter the pumps 6C, 8C, 10C and 12C if the stage 4C is in operation. That liquid which is not required by the stage C can pass via the conduit portion 20B to the pumps of the stage B, and the liquid which is not required by the latter stage can pass via the conduit 20A to the stage A.

In broken lines and designated with reference numeral 15 I have shown a conduit portion which illustrates that instead of supplying and removing the liquid radially of the rotor 17, the liquid could also be supplied centrally and axially of the rotor and be removed via the conduit 20 radially of the rotor. FIG. 3 shows the internal construction of pump 6A which is representative of that of the other pumps used in the system.

It will be appreciated that the starting voltage need not be 17,000 but could be higher or lower, and that depending upon the construction of the generator 19, the voltage which is available at its outputs 21 could be higher or lower than that which has been mentioned by way of example, namely 220 volts. In any case, however, stepping-down of the voltage from the respective source A to the outputs 21 of the generator 19 will be obtained without resorting to electrical means. Also, if for instance the voltage of the source 22A drops significantly, the stage B fed by the source 22B can be put into operation, to make up for the voltage drop of the source 22A, so as to maintain the output of the generator 19 unchanged.

It should be understood that it is possible to use gearing units instead of the hydraulic pumps and their associated conduits. In that case, the motor 4A would drive the generator 19 via a series of differential gearing units.

It will be understood that each of the elements described above, or two or more together, may also find a useful application in other types of constructions differing from the types described above.

While the invention has been illustrated and described as embodied in a step-down transformer arrangement it is not intended to be limited to the details shown, since various modifications and structural changes may be made without departing in any way from the spirit of the present invention.

I wish it to be understood that the arrangement can be used otherwise than in the environment and for the purposes of the single embodiment that has been described and illustrated for purposes of explanation. The circuits A, B, or C could also be employed individually. Furthermore, any or all of the circuits A, B or C could be driven by means other than the electric motors 4A, 4B or 4C, such as a gear drive; a fan; flowing water or a body of water changing its level; counter-balance weights; a spring return mechanism; an internal combustion engine; a steam or other turbine; a pressure clutch mechanism; centrifugal force; a jet engine; an electric motor powered by a solar battery; a driven input shaft; a driven coupling; an arrangement using an electric motor driven by energy produced in a generator which in turn is driven by a steam turbine that is driven from a nuclear reactor; a pyroscopic drive; a heavy weight released from a higher level to descend and start rotation of the first fluid motor in the circuit, and gear transmission driven by the fluid motor to re-lift the weight due to the mechanical advantage offered by the gearing; a steam engine; an air compressor; a fluid pump; a different fluid motor; a reciprocating fluid-operated motor, such as a reciprocating-piston internal combustion engine; a fly wheel; a jet stream; an electric motor driven by a storage battery; the forward or reverse motion of a train; a pulley; a carrier; a gear-to-gear drive; a propeller, such as an airscrew; a ram jet with cycling control to turn a fluid-operated jet engine; a hydraulic fluid flow; or an electric generator which generates energy and in addition drives the respective circuit. Of course, all of these drive possibilities could also be employed to directly drive the rotor 17, and in many cases it would be necessary to interpose appropriate connecting mechanisms between the drive and the pumps 6A, 6B or 6C, or between the drive and the rotor 17.

Similarly, the individual or combined circuits A, B or C need not drive the rotor 17 and via it the generator, just as the rotor 17 (driven by the circuits A, B, C or directly by one of the alternate drives mentioned above) need not drive the generator 19. The circuits A, B, C, the alternate drives or rotor 17 could be employed to power devices other than the generator 19. Among these are gears; a water pump or generally a fluid pump; an air compressor; a gas compressor, e.g. for an air-conditioning unit; a jet engine; the drive train or wheels of an automobile; the wheels of a locomotive; a rocket engine; a fan; a propeller of a naval vessel; an airscrew of an airplane or a helicopter; a drill; a fluid motor; a wrench; a compressor; an internal combustion engine; a drive shaft for a user; a coupling to be driven; a pressure clutch; a transmission; a centrifugal pump; a screw-type compressor; space-vehicle drives; an electric motor; counter-weights; a spring-drive to be wound up; a press; a radial or other type of saw; a conveyor; an impeller, an antenna or reflector which must be rotated or otherwise displaced, or a grinding machine.

It should also be understood that any or all of the circuits A, B, C could drive more than one rotor 17. For example, the rotor 17 could be the first or the last in a series of rotors in which the successive rotors are always of greater capacity than the respective preceding rotor. The principle is also applicable if the circuits are omitted; e.g. if the motor 4A (or 4B, 4C) or whatever device may replace it in accordance with the earlier description, directly drives a series of fluid motors of which each successive one is larger than and is driven by the preceding fluid motor.

To save energy during start-up of the system, in the embodiment shown in FIG. 1 or in any of the disclosed modifications or alternatives, the driven device (e.g. the generator 19) may be so connected with the driving device (e.g. the rotor 17) that the driven device is coupled with the driving device only when the latter reaches a predetermined operating speed. For this purpose, a centrifugal clutch (known per se) may be interposed in the shaft 18, for example by making the shaft 18 of two parts which are connectable by the clutch in motion-transmitting relationship when the rotor 17 rotates at a preselected speed.

Another way of accomplishing the same purpose, assuming the driven device is the generator 19, would be to so effect relative movement of the stator of the generator 19 and the rotor thereof as to slowly initiate generation of electric energy; e.g. the stator may be moved into energy-generating position relative to the rotor when the device 17 rotates at a predetermined speed.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

It should also be understood that the last pressure exerted on the last fluid motor of the driving stage may be reverted to the first or the smallest of the fluid motors of the driving stage to obtain a greater rotational ratio between the last fluid motor and the first fluid motor. The purpose of this is to further reduce power exertion on the driving motors.

What is claimed as new and desired to be protected by Letters Patent is set forth in the appended claims:

1. A drive system, comprising drive means including a motor adapted to be driven from a source of high-voltage energy; driven means including a generator adapted to produce lower-voltage electric energy; intermediate means powered by said drive means and operative for driving said driven means, including at least one closed hydraulic circuit including a circuit loop, a plurality of hydraulic pumps of successively greater capacity which are driven by said motor, and a fluid driven rotor coupled to said generator driving the same and receiving the combined fluid output of said hydraulic pumps; and an auxiliary hydraulic loop, a first auxiliary hydraulic pump in said auxiliary loop and coupled with a drive shaft of said motor, and an auxiliary motor and a second auxiliary pump for driving said first auxiliary pump as a motor, so as to aid in starting-up of said first mentioned motor.

2. A system as defined in claim 1 wherein said motor, said circuit and said plurality of pumps constitute a first driving stage of said means, and wherein said means further comprises at least one second driving stage similar to said first driving stage, the combined fluid output of both of said driving stages being supplied to said rotor.

3. A system as defined in claim 1; and further comprising clutch means between said hydraulic pumps for coupling and uncoupling the same to and from each other.

4. A system as defined in claim 1; and further comprising check-valve means in said conduit loop for imposing one-way flow on the hydraulic fluid therein.

* * * * *